Nov. 17, 1931.  W. WHEELER  1,831,983
MOTOR VEHICLE
Filed Feb. 3, 1927  4 Sheets-Sheet 2
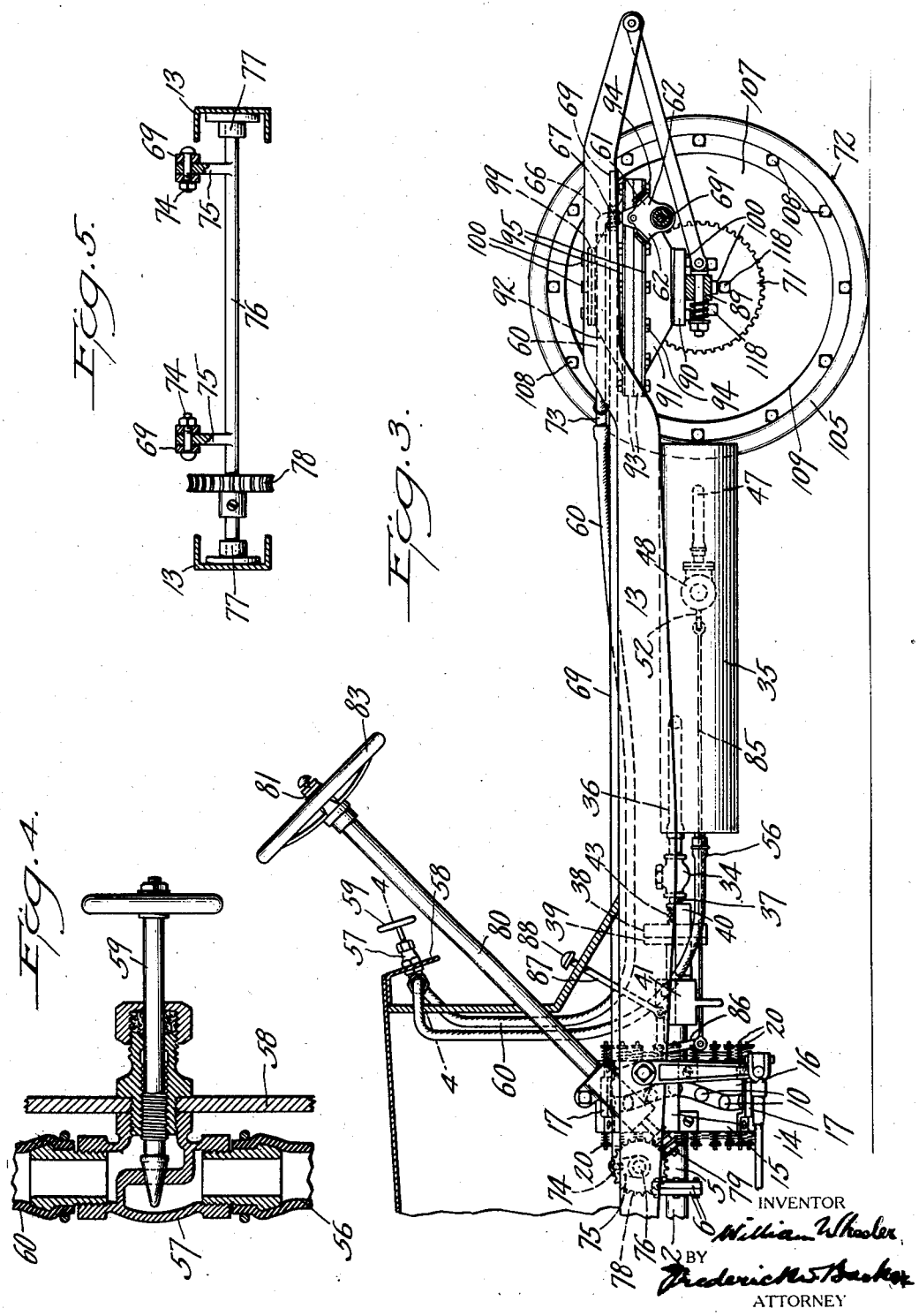

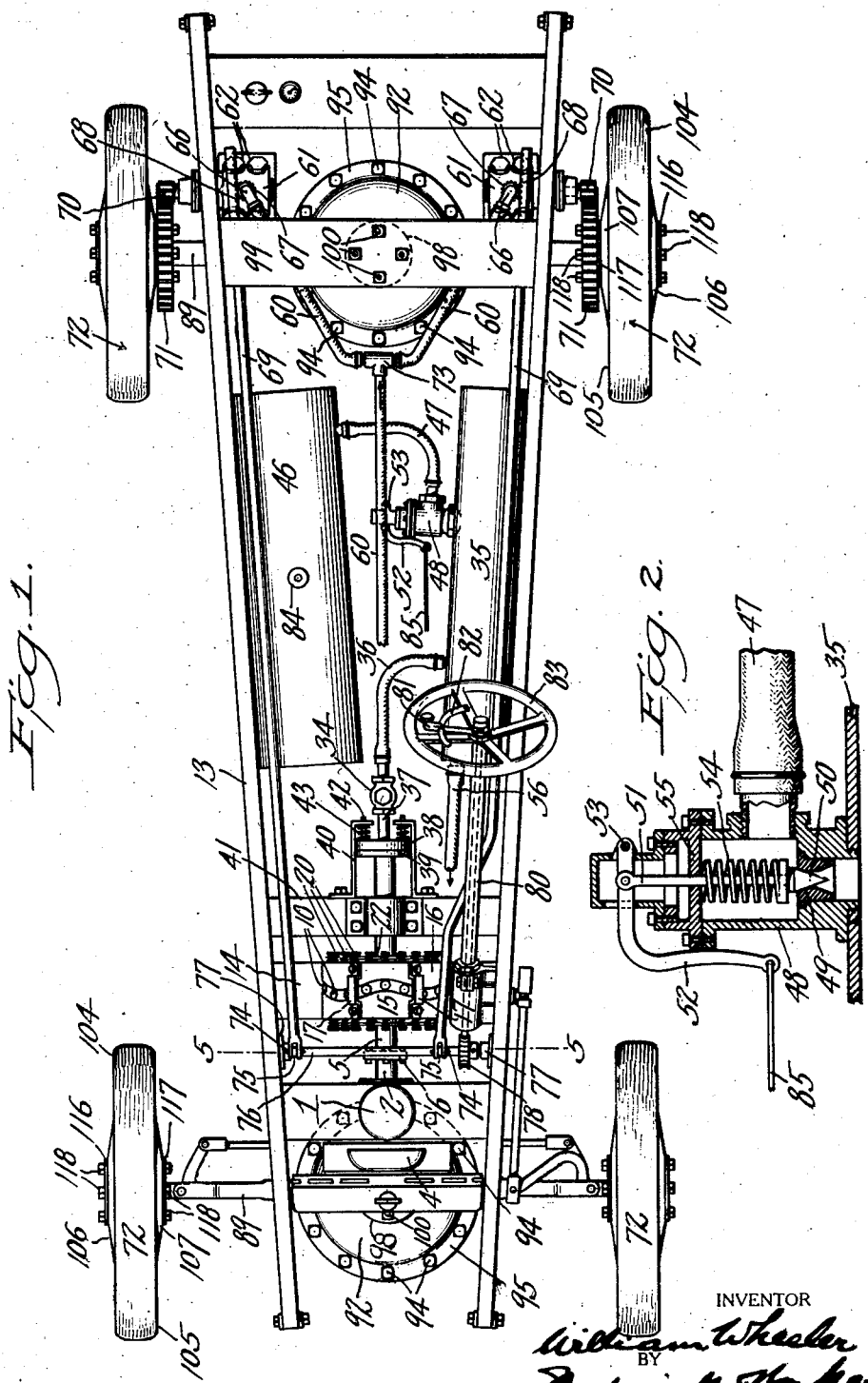

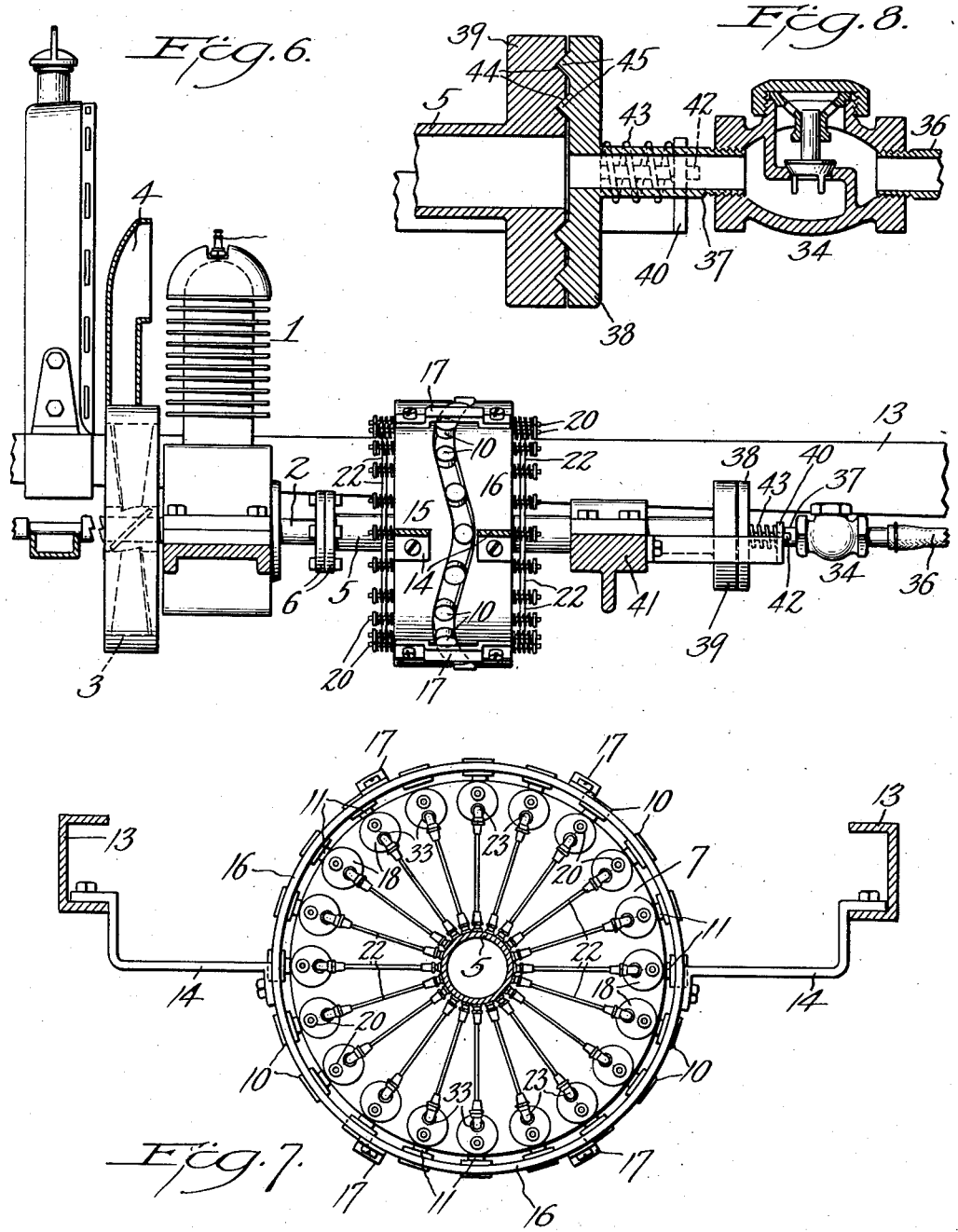

Nov. 17, 1931.  W. WHEELER  1,831,983
MOTOR VEHICLE
Filed Feb. 3, 1927   4 Sheets-Sheet 4
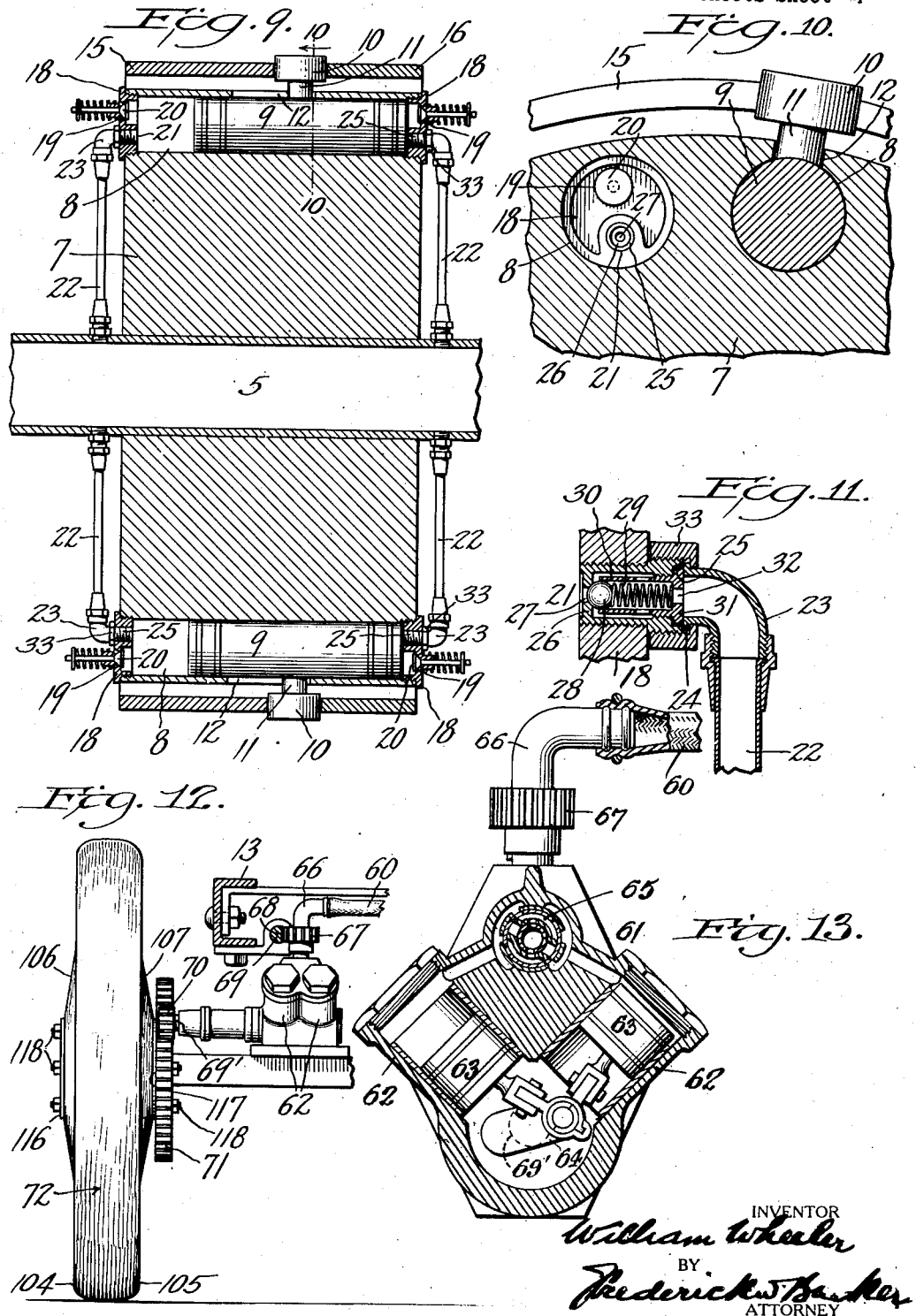

Patented Nov. 17, 1931

1,831,983

UNITED STATES PATENT OFFICE

WILLIAM WHEELER, OF BROOKLYN, NEW YORK

MOTOR VEHICLE

Application filed February 3, 1927. Serial No. 165,564.

This invention relates to motor vehicles, and my improvements are directed to a vehicle which is propelled by compressed air actuating a motor that operates the driving wheels.

The power plant employed with my improved vehicle comprises an internal combustion engine which is to be run continuously at its most efficient speed and which operates an air compressor, that charges a service pressure tank, pressure from this tank being communicated to the motor which rotates the driving wheels of the vehicle. The system also includes a reserve pressure tank that receives excess of air from the service tank, control means being provided whereby pressure from the service tank to the motor can be augmented by pressure from the reserve tank.

Other features and advantages of my invention will hereinafter appear.

In the drawings:

Figure 1 is a plan view of a motor vehicle chassis provided with my improvements.

Fig. 2 is an enlarged sectional detail view of the valve controlling communication between the service pressure tank and the reserve tank.

Fig. 3 is a partial side elevation of Fig. 1, showing the rearward portion thereof.

Fig. 4 is an enlarged, detail sectional view of the pressure control means provided between the compressor and the service pressure tank, on the line 4—4 of Fig. 3.

Fig. 5 is a section on the line 5—5 of Fig. 1.

Fig. 6 is an enlarged detail side elevation, partly in section, showing the forward portion of the chassis, with internal combustion engine, as prime mover, the compressor, and conducting means for compressed air leaving the compressor.

Fig. 7 is a still further enlarged end view of the compressor.

Fig. 8 is a vertical sectional view of the revoluble, leak tight coupling means included in the compressed air conducting means, also showing the check valve in said conducting means.

Fig. 9 is a much enlarged vertical longitudinal sectional view of the compressor.

Fig. 10 is a still further enlarged section on the line 10—10 of Fig. 9.

Fig. 11 is an enlarged sectional view of a check valve in a connection between one of the compressor cylinders and the hollow shaft.

Fig. 12 is a partial rear view of the chassis, partly in section, showing one of the wheel driving motors and a wheel driven thereby, and Fig. 13 is an enlarged vertical section of one of the wheel driving motors.

By my invention, as will be noted, air under pressure constitutes the agency through which propulsive power is communicated to the wheels, the compressed air by continued efficient operation of the prime mover and the storage of compressed air both for service and reserve, enabling the driving motors to be operated under a flexibility of control not attainable for motor vehicles by any other means of so simple and economical a nature.

In considering first the power plant and propulsive means comprised in my invention I have by way of example only shown a single cylinder internal combustion engine 1 as constituting the prime mover, not however restricting myself thereby since an engine having any desirable number of cylinders may be employed. The engine shaft 2 is shown as carrying a fly-wheel 3 which has a fan built therein that connects with a suction hood 4 for cylinder cooling purposes. A hollow shaft 5 is shown as connected by bolted flanges 6 to engine shaft 2, said hollow shaft extending through a circular block 7 with which it is in fixed relation, so that the block and hollow shaft will rotate together. Said block 7, near its periphery, is pierced longitudinally with a number of bores 8, forming cylinders, arranged in an annular series, each of these bores or cylinders containing a shuttle-like piston 9. Each piston 9 carries a roller 10 that connects with its piston, intermediate the length of the latter, by means of a shank 11 which extends through and is slidable within a lengthwise slot 12 that is provided in the peripheral wall of block 7. A two-part ring concentrically surrounds the block 7 in spaced relation therewith, said ring being rigidly connected to the chassis 13 as by brackets 14. The two parts of the ring are respectively indicated by the reference numerals 15, 16 and are shown as spaced apart to receive and form a race-way for the roller 10. Also said ring parts 15, 16, which are connected together by bridge like straps 17, have opposed, complementary curvatures which provide a series of undulations of even extent throughout the circumferential path of the race-way. It will be apparent from the foregoing description that each of the pistons 9, in every revolution of the block 7, will be accorded a number of oscillations by reason of the wavy or undulatory path which the rollers must follow in traversing the race-way provided between the ring parts 15, 16.

Now, by closing the opposite ends of cylinders 8, and equipping those ends with suitable valved intakes and outlets it will also become apparent that the pistons may function within the cylinders as compressors. Thus, at each end of each cylinder there is provided a closure cap 18 having an intake orifice 19 for the reception of atmospheric air, with a spring held check valve 20 to prevent exhaust through said orifice. Also in each cap 18 there is a delivery opening that is controlled by non-return means. The delivery opening is indicated at 21 and communicates by a pipe 22 with the interior of hollow shaft 5, since it is one of the purposes of my invention to utilize said hollow shaft as the means for conducting air compressed by the pistons for ultimate delivery to the wheel driving motors. In Fig. 11 I have shown by enlarged detail view the elbow 23 which connects cap 18 with pipe 22, said elbow having a flange 24 that butts against a bushing 25 which fits within a bore provided therefor in cap 18 and has an end portion 26 pierced with an exit orifice 27 against which a ball 28 is seated. Said ball is held to orifice 27 by a spring 29 contained within a tubular, slotted member 30, having a flanged head 31 with an orifice 32, the flange lying recessed in the bushing end and being engaged by the flanged end 24 of elbow 23, an inwardly flanged nut 33 serving as a coupling to unite the elbow 23 to the bushing 25.

With the foregoing or equivalent intake and outlet means provided at both ends of each cylinder 8 the oscillations of the pistons 9 will cause air to enter said cylinders by suction alternately at their opposite ends and to be discharged therefrom against the tension of springs 29 on the return strokes of the pistons.

The discharged air from all the cylinders 8 is delivered to the hollow shaft 5 by way of the pipes 22, and is conducted through a check valve 34, to a service pressure tank 35. Valve 34 connects at its outlet with a pipe 36 which connects with tank 35, while the inlet portion of valve 34 connects with a pipe 37 that terminates at its free end in a flange-like disk 38. The disk 38, its pipe 37, also the valve 34 and pipe 36 are necessarily fixed against rotation and are suitably supported on the chassis. Connection with the hollow shaft 5 is effected by means of a flange-like disk 39 provided at the free end of shaft 5, the disks 38 and 39 being in opposed, closely abutting relation, to provide a continuous path from the interior of shaft 5, through pipe 36, valve 34 and pipe 37 to tank 35. Brackets 40 carried by a transverse member 41 of the chassis are provided with stems 42 that serve as guides for springs 43 which bear against the disk 38 and urge it into close relationship with disk 39. Also the disk 39 is shown as provided with concentric grooves 44 while the disk 38 has complementary concentric ribs 45 to fit within said grooves and thereby prevent leakage of air between the disks as the disk 39 rotates against disk 38.

In addition to the service pressure tank 35 I provide a reserve pressure tank 46 which is in communication with tank 35 by pipe 47 and valve 48 (see Fig. 2). Valve 48, here shown as connected to tank 35 has a valve seat 49, with which is engaged a valve head 50 having a stem 51 pivoted to a lever 52 that is fulcrumed at 53 to the valve casing. A spring 54, lying between the valve head 50 and a closure member 55 presses said valve head against its seat, the strength of said spring being sufficient to hold a suitable working pressure within tank 35, and to permit the valve to open when that pressure is exceeded for the delivery of surplus pressure into tank 46, whose particular functions will be referred to hereinafter.

Flexible tubing 56 connects tank 35 with a valve 57, here shown as located on the dash 58 and provided with a control member 59, other flexible tubing 60 extending from valve 57 to motors 61, here shown as adapted for the operation of the driving wheels.

The wheel driving motors may be of any desirable type and I have for example here indicated (see Fig. 14) a well known motor such as is used for operating pneumatic drills, it being provided with the cylinders 62, pistons 63, crank 64 and air control mechanism 65.

The elbow connection 66 between tubing 60 and the motor is provided with a pinion 67 that meshes with a rack 68 on a rod 69 for the operation of the air control mechanism, so that the motors may function for either forward or reverse drive.

The motor shaft 69' is provided with a pinion 70 that meshes with a gear 71 carried by a driving wheel 72, for propulsion. In the drawings the tubing 60 is shown as continuing from a union 73 into two branches that respectively connect with the motors 61 for each of the rear wheels. Obviously I am not limited as to the number of the vehicle wheels which are to be operated by motors. A motor control rod 69 is shown for each of the motors illustrated, these rods having pivotal connection at 74 with arms 75 extended from a transverse shaft 76 that is journalled in bearings 77 carried by the chassis. Also the shaft 76 carries a gear wheel 78 with which a worm shaft 79 is in mesh, said worm shaft being here indicated as extending up through the steering post 80, and provided with an operating lever 81 that works over a quadrant 82 mounted on the steering wheel 83.

The reserve pressure tank 46, to which reference has previously been made, becomes charged with air when the predetermined pressure in service tank 35 is exceeded, and if too may then become charged up to a predetermined pressure, a relief valve, indicated at 84, preventing that predetermined pressure from being exceeded.

When the pressure in tank 35 falls below the point of the service demands thereon the lever 52 may be actuated to release valve head 50 from its seat 49, thereby permitting air under pressure from tank 46 to flow into tank 35 to restore the service pressure therein.

A connector 85 extends from lever 52 to a bell-crank 86, which is actuable by a push rod 87, having a pedal 88 for foot operation, in the manner of an accelerator.

While I have herein described and illustrated a particular form of compressor of high efficiency as operable by an internal combustion engine for charging the service and reserve pressure tanks, my invention is not limited thereby but is intended to be comprehensive of any desirable form of air compressor operable by a prime mover for storing compressed air in a tank to be used in operating a motor vehicle.

Still further, as will be readily appreciated, the air compressor disclosed in this application can with suitable modification be caused to function as an internal combustion engine wherewith to operate another compressor. In such instance the gaseous charges for the cylinders 8 will be received from the hollow shaft 5.

Further my invention is believed to be on a broad enough basis to comprehend the employment on a motor vehicle of a service pressure tank and a reserve tank charged with compressed air for the actuation of the motor employed in the propulsion of said motor vehicle.

Variations within the spirit and scope of my invention are equally comprehended by the foregoing disclosure.

I claim:

1. The combination with a motor vehicle having a primer mover of a hollow shaft driven by said prime mover, air compressing means carried by said hollow shaft, a fixed hollow shaft in communication with said driven hollow shaft, a service pressure tank in communication with said fixed hollow shaft, means for communicating compressed air, from said compressor, through said hollow shaft to said tank, and means for applying pressure from said tank for the propulsion of the vehicle.

2. In a motor vehicle including a prime mover, a shaft driven by said prime mover and a compressor carried by said shaft, said compressor comprising a circular member having an annular series of longitudinally disposed bores, a piston in each bore, a fixed casing in concentric relation to said circular member and provided with a circular, undulatory raceway, thereby causing the pistons to oscillate, closures at each end of said bores, each closure being provided with air intake means and delivery means.

3. The subject matter of claim 1, characterized by the provision of a reserve pressure tank in pressure controlled communication with the service pressure tank.

New York, February 2nd, 1927.

WILLIAM WHEELER.